United States Patent

Kawamura

Patent Number: 5,369,689
Date of Patent: Nov. 29, 1994

[54] FACSIMILE APPARATUS

[75] Inventor: Wataru Kawamura, Zama, Japan

[73] Assignee: Canon Kabushiki Kaisha, Tokyo, Japan

[21] Appl. No.: 206,265

[22] Filed: Mar. 7, 1994

Related U.S. Application Data

[63] Continuation of Ser. No. 859,811, Mar. 30, 1992, abandoned.

[30] Foreign Application Priority Data

May 13, 1991 [JP] Japan ................. 3-107313

[51] Int. Cl.$^5$ .................................. H04M 11/00
[52] U.S. Cl. ............................... 379/100; 379/110; 379/355
[58] Field of Search ............... 379/100, 96–98, 379/93, 354–356, 387, 110, 442; 358/434, 438, 440–442, 468, 400

[56] References Cited

U.S. PATENT DOCUMENTS

| | | |
|---|---|---|
| 4,313,139 | 1/1982 | Logie ......................... 379/100 |
| 4,481,382 | 11/1984 | Villa-Real . |
| 4,535,097 | 10/1982 | Takeda et al. ................. 379/100 |
| 4,881,129 | 11/1989 | Mitsuhashi .................... 379/100 |
| 4,897,869 | 1/1990 | Takahashi ..................... 379/100 |
| 4,916,732 | 4/1990 | Kotani et al. ................. 379/100 |
| 4,920,561 | 4/1990 | Mitchell ...................... 379/97 |
| 5,027,385 | 6/1991 | Nakagawa et al. .............. 379/100 |
| 5,040,206 | 8/1991 | Tokumasu et al. .............. 379/100 |
| 5,093,857 | 3/1992 | Yoshida et al. ............... 379/100 |
| 5,200,991 | 4/1993 | Motoyanagi ................... 379/100 |
| 5,233,641 | 8/1993 | Maeda . |

FOREIGN PATENT DOCUMENTS 60-214126 10/1985 Japan .

Primary Examiner—Wing F. Chan
Attorney, Agent, or Firm—Fitzpatrick, Cella, Harper & Scinto

[57] ABSTRACT

A facsimile apparatus which (1) sends a predetermined dial signal to a telephone line and (2) calls an attached telephone set. The predetermined dial signal is sent at a predetermined time, and the call to the attached telephone set is made after the predetermined dial signal has been sent to the telephone line.

13 Claims, 3 Drawing Sheets

FACSIMILE APPARATUS

This application is a continuation of application Ser. No. 07/859,811 filed Mar. 30, 1992 now abandoned.

BACKGROUND OF THE INVENTION

1. Field of the Invention

This invention relates to a fascimile apparatus to which a telephone set can be connected.

2. Description of the Related Art

A telephone set (subset) connected to a facsimile apparatus can usually perform conversation via a telephone line. Some recent facsimile apparatuses have a function of ringing a subset to call a person present in the vicinity of the subset (a so-called FAX/TEL switching function), or connecting to and starting a message-leaving telephone by functioning as a subset (a so-called message-leaving telephone connection function).

Some facsimile apparatuses also have an alarm function, i.e., for example, they function as an alarm clock or the like, or a timer transmission function, i.e., they perform transmission by automatically dialing at an assigned time.

In the above-described conventional facsimile apparatuses, however, a simplified exchange function, a timer function and an automatic dialing function operate independently. No attempt has been made to provide a more convenient facsimile apparatus by combining these independent functions.

Particularly, the alarm function is frequently used to wake up a person. When the awoken person wants to know the day's weather forcast or traffic status, it is more convenient for him to utilize a telephone service than to wait until a television or radio program reports a weather forcast or traffic status. This holds particularly true in a time zone where such programs are less frequent. Recent telephone services provide an increasing amount of information, such as music, "one's fortune of the day" and the like, in response to diverse tastes and preferences of users. As a result, the use of such services has been increased.

However, when a person is awoken by the alarm function and intends to utilize one of the above-described telephone services, he must go through the trouble of dialing a telephone number.

SUMMARY OF THE INVENTION

It is an object of the present invention to provide a facsimile apparatus which has a novel function.

It is a further object of the present invention to make it easier for a user to utilize a telephone service.

It is still a further object of the present invention to provide a facsimile apparatus which dials a predetermined telephone number at a predetermined time and subsequently calls a subset.

It is still another object of the present invention to provide a facsimile apparatus which dials a predetermined telephone number at a predetermined time and calls a subset at a second predetermined time.

Other objects, features and advantages of the invention will become more fully apparent from the following detailed description of the preferred embodiments taken in connection with the accompanying drawings.

DETAILED DESCRIPTION OF THE PREFERRED EMBODIMENTS

Figure 1:
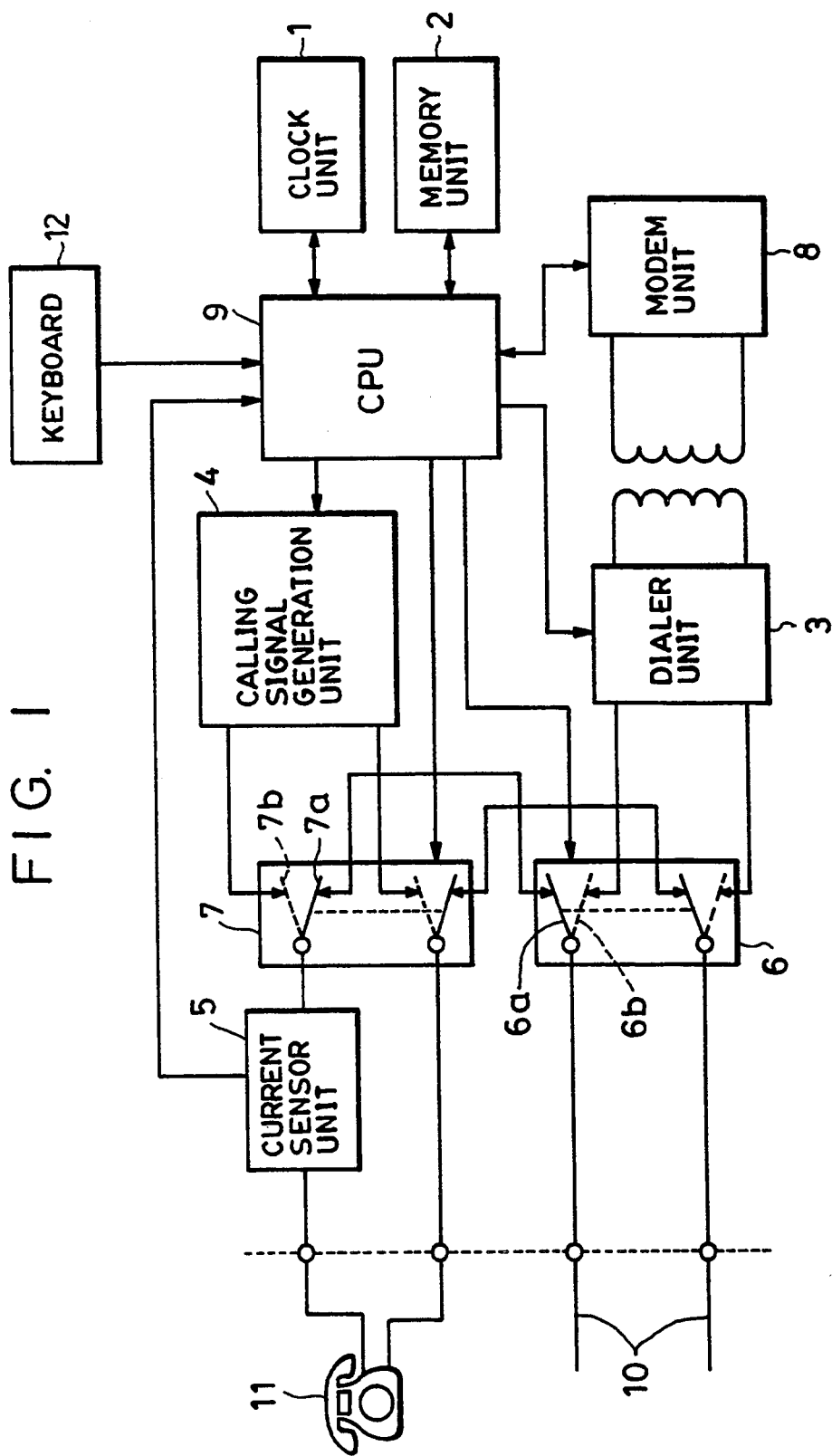
FIG. 1 is a block diagram showing a principal part of a facsimile apparatus according to an embodiment of the present invention.

FIG. 1 is a block diagram showing the configuration of a facsimile apparatus according to one embodiment of the present invention. In FIG. 1, a recording unit, a reading unit, a display unit and other well known units in a facsimile apparatus are not illustrated.

A clock unit 1 can read the current time. A memory unit 2 can read and write assigned times and telephone numbers. A dialer unit 3 transmits a selection signal to a telephone line. A calling signal generation unit 4 rings the calling bell of a telephone set. A current sensor unit 5 detects current flowing through the connected line. A relay unit 6 switches between contacts 6a and 6b for connection to a telephone line 10. A relay unit 7 switches between contacts 7a and 7b for connection to a telephone set 11. A modem unit 8 performs facsimile communication. A CPU (central processing unit) 9 controls the above-described units. The telephone line 10 is connected to the facsimile apparatus. The telephone set 11 is directly connected to the fascimile apparatus, that is, it comprises a subset. There is also shown a keyboard 12.

In a standby state, the relay units 6 and 7 are connected to the contacts 6a and 7a, respectively.

Figure 2:
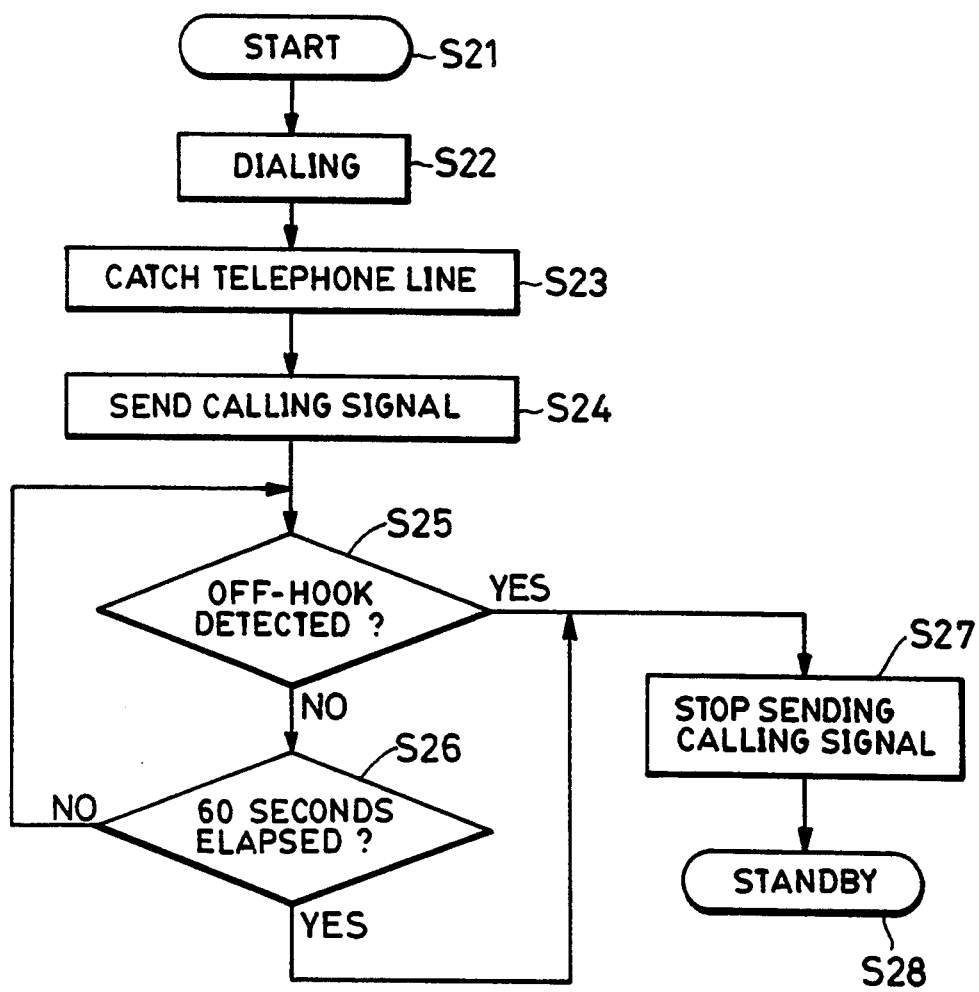
FIG. 2 is a flowchart of an operation of the facsimile apparatus of the embodiment shown in FIG. 1.

The way in which the CPU 9 controls the other units will now be explained with reference to a flowchart shown in FIG. 2.

When the data obtained by subtracting 30 seconds from the time data previously stored in the memory unit 2 by using the keyboard 12 coincides with data of the current time in the clock unit 1, the CPU 9 starts step S21 of the flowchart. In step S22, the CPU 9 reads a telephone number previously stored in the memory unit 2 (the telephone number of a telephone service), connects the relay unit 6 to contact 6b, and transmits a selection signal from the dialer unit 3 to the telephone line 10. After transmitting the signal, in step S23, the telephone line 10 is kept caught while the relay unit 6 is connected to contact 6b. In the case of a telephone service, the connection is completed in a few seconds, and voice of the telephone service reaches contact 6b through the telephone line 10.

In step S24, the CPU 9 connects the relay unit 7 to contact 7b, and transmits a calling signal from the calling signal generation unit 4 to the subset 11. This calling signal has a period of three seconds, i.e., 0 V (volt) for two seconds and 150 V for one second. The subset 11 repeats a period of no sound for two seconds and bell ringing for one second to call the user present in the vicinity of the subset 11. During this time period, in step S25, the CPU 9 monitors if the subset 11 is off-hook, using the current sensor unit 5. When the subset 11 is in an on-hook state, since no current flows in the line, the current sensor unit 5 is not activated.

If the subset 11 is in an off-hook state, current flows in the line when the calling signal generation unit 4 transmits 150 V, the current sensor unit 5 is thereby activated, and the CPU 9 detects that the subset 11 has been taken off-hook. If an off-hook state is not detected, the process proceeds to step S26, where the CPU 9 checks whether or not a time limit of 60 seconds has elapsed. If 60 seconds have not elapsed, the process returns to step S25, where the subset 11 is monitored again. If an off-hook state is detected within 60 seconds after the ringing at the subset 11, the process proceeds to step S27, where the CPU 9 stops sending the calling signal from the calling signal generation unit 4.

Subsequently, in step S28, the relay unit 7 is first connected to contact 7a, and the relay unit 6 is then connected to contact 6a. It is thereby possible to hear a voice service, such as a telephone service or the like, coming from the telephone line 10, through the handset of the subset 11. In step S28, the facsimile apparatus is in a standby state.

After hearing the voice service, the telephone line is opened by returning the handset of the subset 11 to the on-hook state, whereby call reception from the telephone line 10 and calling from the subset 11 to the telephone line 10 is possible.

Next, an explanation will be provided of the case wherein the subset 11 is not taken off-hook within 60 seconds in the loop of steps S25 and S26. When the lapse of 60 seconds has been detected in step S26, the process proceeds to steps S27 and S28 in the same manner as described above, where the CPU 9 stops sending the calling signal, and connects the relay units 7 and 6 to contacts 7a and 6a, respectively. Since the subset 11 is in an on-hook state, the facsimile apparatus is in a standby state while opening the telephone line.

In the present embodiment, the time needed for dialing is set to 30 seconds or less, and step S21 is executed 30 seconds before an assigned time. In an improved embodiment, however, the CPU 9 calculates the number of digits of the telephone number stored in the memory unit 2, a pause time included in the telephone number, and the time corresponding to whether the selection signal comprises pulses or tones, whereby the CPU 9 sets the time needed for dialing to a time which is optimum for every case. By such an approach, the time for executing step S24 becomes more exact with respect to the time desired by the user.

Figure 3:
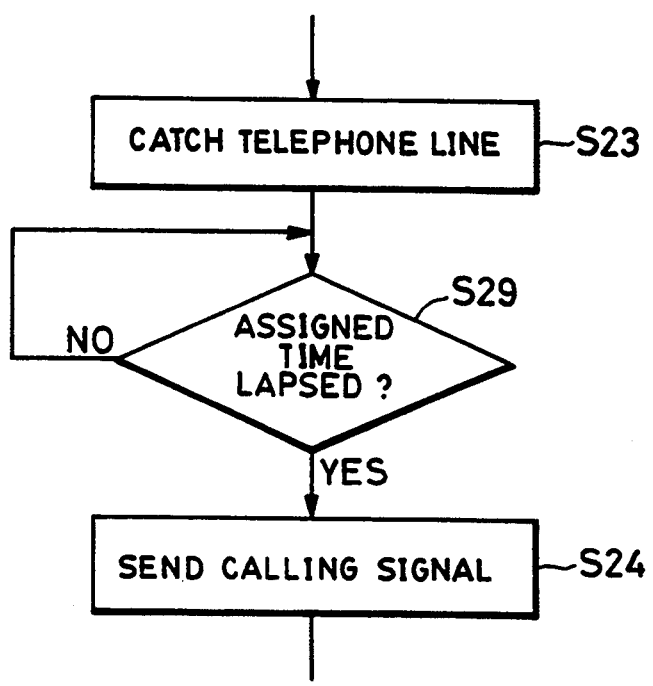
FIG. 3 is a flowchart of an operation of another embodiment of the present invention.

Furthermore, by executing step S22 30 seconds before an assigned time, determining whether the assigned time has lapsed by referring to the clock unit 1 between steps S23 and S24 (step S29), as shown in FIG. 3, and executing step S24 when the time assigned by the user has lapsed, it is possible to ring the bell of the subset 11 exactly at the assigned time.

It is also possible to combine the above-described embodiments. That is, the time needed for dialing may be calculated, process S22 may be executed earlier than the assigned time by the amount of the calculated time, and process S24 may be executed after the determination in process step S29.

If the main body of a cordless phone is connected as the subset 11, the degree of freedom in placing the handset of the cordless phone increases, since wiring work is not needed. Accordingly, the handset may be placed in a work area to be used as a usual telephone set, and may be placed in a bedroom when it is to be used as an alarm clock. Thus, the alarm function of ringing the subset is effectively utilized.

The present invention may also be applied to a G4 facsimile apparatus.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A facsimile apparatus comprising:
   memory means for storing a time and a dial number;
   sending means for sending a dial signal to a telephone line, the dial signal being either a pulse type and a tone type;
   ringing means for ringing an attached telephone set; and
   control means for controlling said sending means so as to send a dial signal according to the dial number stored in said memory means to the telephone line at a first timing according to the time stored in said memory means and the type of the dial signal,
   wherein said control means controls said ringing means so as to ring the attached telephone set at a second timing according to the time stored in said memory means.

2. A facsimile apparatus according to claim 1, wherein said control means controls said ringing means so as to ring the attached telephone set when a predetermined time has passed after the first timing.

3. A facsimile apparatus according to claim 2, wherein the predetermined time corresponds to a time which is needed for sending the dial signal.

4. A facsimile apparatus according to claim 1, wherein said control means further includes detecting means for detecting a response of the attached telephone set, and connects the attached telephone set to the telephone line when the response of the attached telephone set to the calling by said calling means has been detected by said detecting means.

5. A facsimile apparatus according to claim 1, wherein said calling means calls the attached telephone set by means of a 150-volt intermittent signal.

6. A facsimile apparatus according to claim 1, wherein said control means connects the telephone line and the attached telephone set which is rung by said ringing means when the attached telephone set is off-hook.

7. A communication apparatus comprising:
   setting means for setting a first time and a dial number;
   sending means for sending a dial signal according to the dial number set by said setting means to a telephone line at a second time which is earlier than the first time by a predetermined time; and
   driving means for driving a sound generator to generate a sound at the first time set by said setting means.

8. A communication apparatus according to claim 7, wherein the predetermined time is determined based on a type of the dial signal.

9. A communication apparatus according to claim 8, wherein the dial signal is selected one of a pulse type and a tone type.

10. A communication apparatus according to claim 7, wherein the predetermined time is determined based on a number of digits of the dial number.

11. A communication apparatus according to claim 7, wherein the sound generator includes a bell of a telephone set.

12. A communication apparatus comprising:
memory means for storing a time and a dial number;
sending means for sending a dial signal according to the dial number stored in said memory to a telephone line at a first timing according to the time stored in said memory means and a number of digits of the dial number; and
driving means for driving a sound generator to generate a sound at a second timing according to the time stored in said memory means.

13. A communication apparatus according to claim 12, wherein said sound generator includes a bell of a telephone set.

* * * * *